June 21, 1960

O. D. SMITH 2,941,221

VEHICLE WASHING EQUIPMENT

Filed Sept. 15, 1958

Inventor
Oliver Douglas Smith
By: Scrivener and Parker,
attorneys

June 21, 1960

O. D. SMITH 2,941,221

VEHICLE WASHING EQUIPMENT

Filed Sept. 15, 1958

Inventor
Oliver Douglas Smith

June 21, 1960

O. D. SMITH 2,941,221

VEHICLE WASHING EQUIPMENT

Filed Sept. 15, 1958

Inventor
Oliver Douglas Smith
By: Scrivner and Parker
Attorneys

United States Patent Office 2,941,221
Patented June 21, 1960

2,941,221

VEHICLE WASHING EQUIPMENT

Oliver Douglas Smith, Cedar Lawns, Kingswood Lane, Lapworth, England

Filed Sept. 15, 1958, Ser. No. 761,222

Claims priority, application Great Britain Sept. 17, 1957

4 Claims. (Cl. 15—21)

This invention relates to equipment for cleaning vehicles, in particular public service road vehicles, railway coaches and driving units. In the most commonly known forms of equipment of this kind, the vehicle is driven at a convenient speed between or beneath sprays of water from fixed spraying heads and rotating brushes may or may not simultaneously be applied to the surface of the vehicle.

Hitherto it has been proposed to apply a detergent oil simultaneously with the water to assist in cleaning of the vehicle, but, as the water is normally left running and the detergent is allowed to fall continuously by gravity into it for supplying to the sprays, this is very wasteful in detergent.

It is an aim of the present invention to provide means for utilising the detergent in an economical and effective manner when and where it is required. A further aim is economy in the whole of the water supply by control of the equipment by the presence of a vehicle.

According to the invention, vehicle washing equipment comprising a power-driven rotary brush and at least one water-spray pipe includes a pump for feeding a detergent into the water supply, this pump being driven from the same power source as the brush. In this way the detergent is only supplied when the brush is running and at all other times, whether or not the water supply is on, no detergent is being consumed. In one convenient arrangement the detergent is in the form of a liquid or a very strong solution and is drawn from a storage tank by a pump disposed on the upper end of the brush shaft.

According to a further feature of the invention the power supply to the brush and detergent pump is controlled automatically by the passage of a vehicle past the equipment, the arrangement being such that the equipment is switched on automatically as the vehicle approaches and is likewise switched off when the vehicle has passed. In this way the degree of thoroughness of the cleaning can be controlled to suit the amount of contamination on it by appropriately adjusting the speed at which the vehicle is driven past the equipment. The water supply may be controlled manually or automatically in the same way. The control can be achieved in the same way. The control can be achieved by photoelectric cells or by floor switches, such as those operated by pneumatic tubes over which the vehicle wheels pass.

An example of vehicle cleaning equipment according to the invention will now be described with reference to the accompanying drawings, in which.

Figure 1:
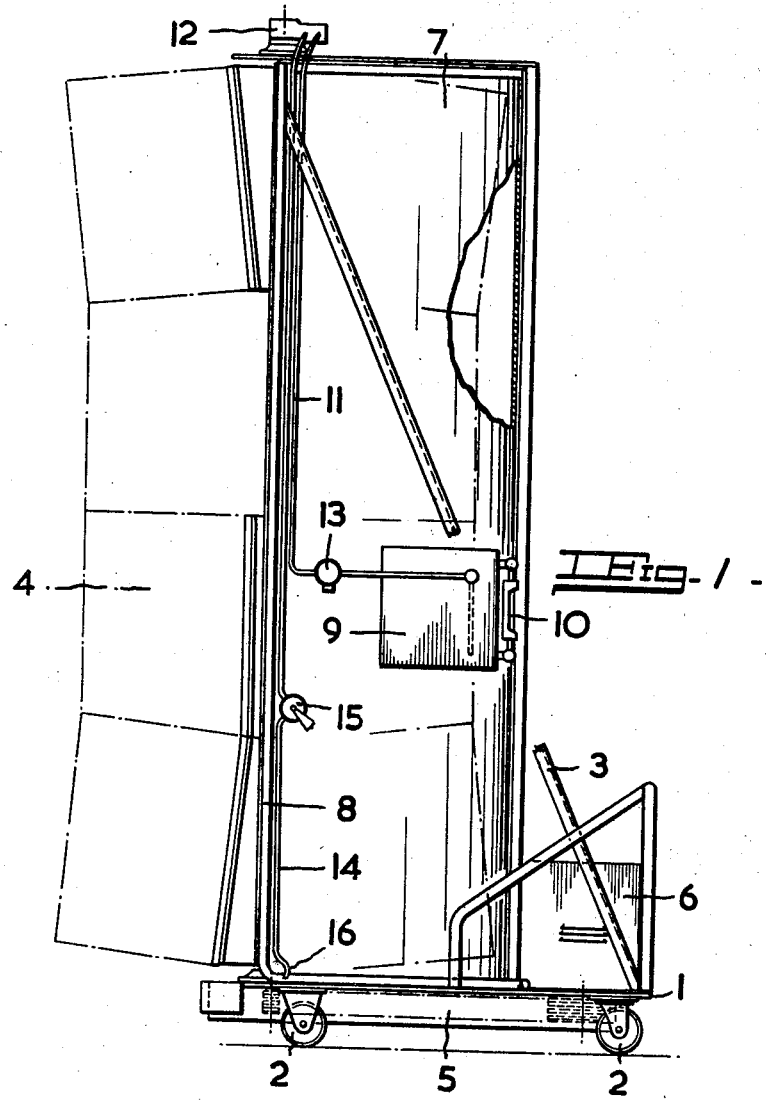
Figure 1 is a side elevation of the equipment.
Figure 2:
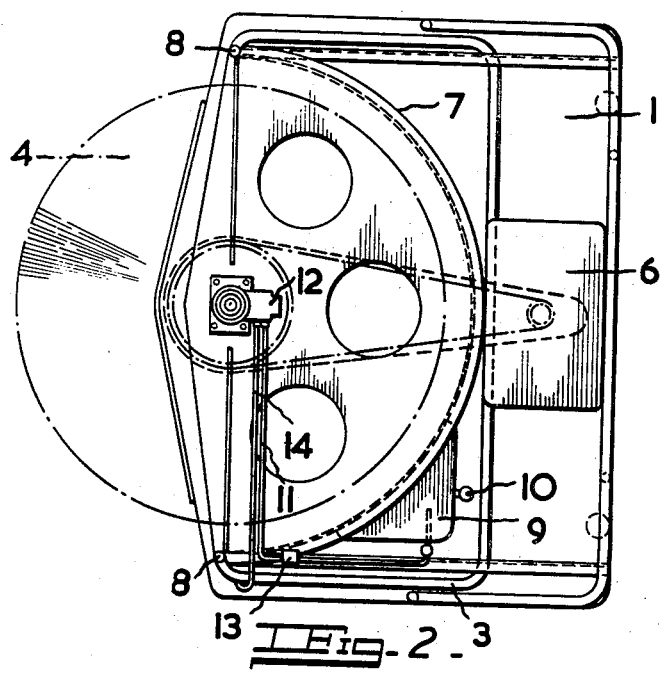
Figure 2 is a plan view.

Referring first to Figures 1 and 2, the equipment comprises a platform 1 on wheels 2 and supporting on a framework 3, a brush 4 rotatable about a substantially vertical axis. The brush 4 is driven through a belt drive 5 from an electric motor 6 mounted on the platform 1. A semi-cylindrical cowling 7 protects the brush on one side, and there are vertical water pipes 8 extending up each side of the cowling 7, provided with apertures (not shown) for spraying water onto the side of a vehicle on each side of the brush 4.

A tank 9 provided with a level sight glass 10 is connected by a pipe 11 to a pump 12 which is mounted on top of the equipment and driven from the upper end of the shaft of the brush 4. The tank 9 is filled with a liquid detergent or a strong aqueous detergent solution and this is taken up by the pump 12 through a filter 13 and delivered through a pipe 14 and a manually adjustable flow control valve 15 to a point 16 in the lower end of one of the water spray pipes 8. This valve 15 enables the operator to preset accurately the rate at which the detergent is delivered. It also enables the detergent supply to be shut off entirely when desired, for example when the vehicle is only very slightly dirty. Normally it will be in that pipe which sprays water onto the vehicle ahead of the brush 4, but it could be in both pipes and also in additional water spray pipes.

Normally two sets of equipment of the kind described are used and they will be arranged facing each other at such a distance apart that a vehicle driven slowly between them is brushed and washed simultaneously on both sides. The water supply can be controlled manually and the brush 4 is started by switching on the motor 6. The operator need pay no attention to the detergent supply (apart from ensuring that there is an adequate quantity in the tank 9) since this is automatically controlled by the rotation of the brush 4.

Figure 4:
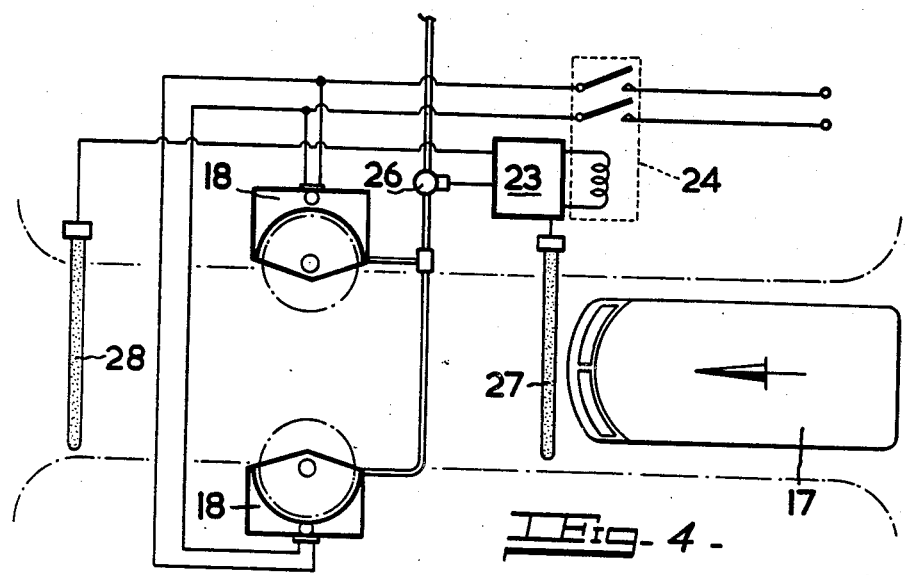
Figure 4 shows an alternative form of automatic control.
Figure 3:
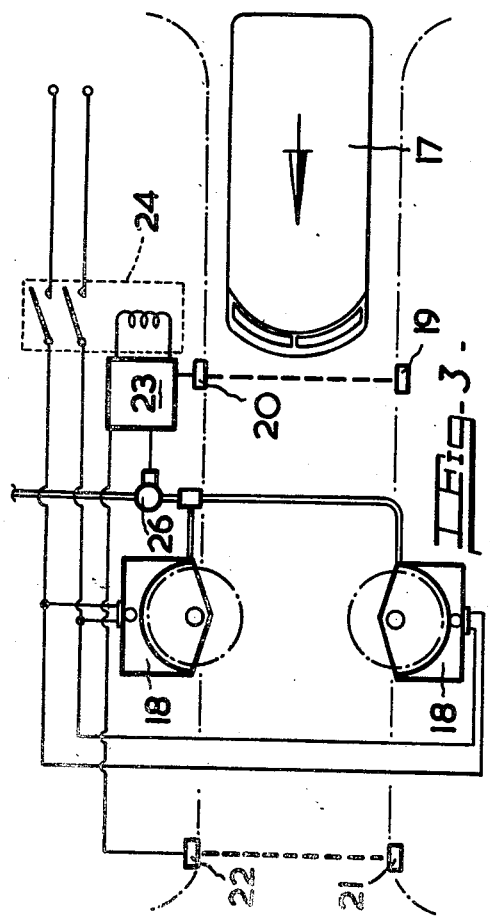
Figure 3 shows diagrammatically a layout in which two of the equipments are automatically controlled by the vehicle to be cleaned.

Figures 3 and 4 show diagrammatically how both the brush drive and the water supply can be controlled automatically by the vehicle. The vehicle is shown at 17, passing between two equipments 18. In Figure 3 a source of radiation (light or infra-red rays) 19 projects a beam onto a photo-electric cell 20, this beam being interrupted by the vehicle as it approaches the equipments, and a further source 21 and cell 22 are disposed to have their beam interrupted by the vehicle as it leaves the equipment. Both cells are connected to a device 23 which interprets their signals and controls, by means of a relay 24, the electric power supply to the motors driving the two brushes. At the same time the water supply to both equipments is controlled by a solenoid-operated valve 26. The arrangement is such that interruption of the beam to the cell 20 switches the water and brushes on and interruption of the beam to the cell 22 switches them off.

Figure 4 shows an arrangement very similar to that of Figure 3, differing only in that the photo-electric cells and light sources are replaced by pneumatic tubes 27 and 28 of a kind well known for operating electric switches on the passage of a vehicle over them.

I claim:

1. Vehicle cleaning equipment comprising a rotary brush, power driving means for said brush, at least one water spray pipe, a source of water feeding the water spray pipe, a detergent storage tank, a detergent delivery pump, a fluid pipe connection between said tank and said pump, a fluid pipe connection between said pump and said water spray pipe, a mechanical driving connection between said power driving means and said pump, a switch controlling said power driving means, and vehicle-operated means controlling said switch, said vehicle-operated means being disposed to close said switch on approach of a vehicle to the region of the equipment and to open said switch on departure of the vehicle.

2. Vehicle cleaning equipment as claimed in claim 1, wherein said vehicle-operated means comprises at least one photo-electric cell and radiation source, disposed on opposite sides of the path of the vehicle.

3. Vehicle cleaning equipment as claimed in claim 1, wherein said vehicle-operated means comprises at least one pneumatic tube disposed in the path of the vehicle.

4. Vehicle cleaning means as claimed in claim 1 including a valve between the source and the spray pipe, and an operative connection between said valve and vehicle-operated means whereby said valve is opened with the closing of said switch and closed with the opening of said switch.

References Cited in the file of this patent

UNITED STATES PATENTS

| | | |
|---|---|---|
| 2,230,404 | Healey | Feb. 4, 1941 |
| 2,253,609 | Byron | Aug. 26, 1941 |
| 2,282,628 | Whann | May 12, 1942 |
| 2,705,810 | McDermott | Apr. 12, 1955 |
| 2,716,767 | Davis | Sept. 6, 1955 |
| 2,830,311 | Vizdos | Apr. 15, 1958 |

FOREIGN PATENTS

| | | |
|---|---|---|
| 721,450 | Great Britain | Jan. 5, 1955 |